April 20, 1954

J. B. BRENNAN 2,676,287

ELECTRICAL CONDENSER AND LAMINATED SEALING MEANS THEREFOR

Filed Jan. 18, 1950

INVENTOR.
JOSEPH B. BRENNAN
BY
West & Oldham
ATTORNEYS

Patented Apr. 20, 1954

2,676,287

UNITED STATES PATENT OFFICE 2,676,287

ELECTRICAL CONDENSER AND LAMINATED SEALING MEANS THEREFOR

Joseph B. Brennan, Cleveland, Ohio

Application January 18, 1950, Serial No. 139,244

10 Claims. (Cl. 317—230)

This invention relates to electric condensers, and particularly to the laminated sealing means provided for an open end of the condenser.

The general object of the present invention is to provide a novel, improved laminated sealing means in a condenser, which sealing means is characterized by the ease of threading condenser terminals through the sealing members.

Another object of the invention is to provide a condenser with sealing means that can be rapidly and easily assembled in a condenser but yet which can provide effective sealing action when completely positioned in the condenser.

A further object of the invention is to provide a laminated sealing device for a condenser, wherein both rigid and deformable sealing lamina are provided and with holes or slots being provided in such lamina for passage of condenser terminals therethrough.

The foregoing and other objects and advantages of the invention will be made more apparent as the specification proceeds.

Heretofore there have been some different types of laminated closures or sealing means provided for electric condensers and one United States patent upon a device of this type is Patent No. 2,144,959. The structure shown in this patent includes a plurality of rigid discs which are positioned in superimposed relation with a deformable disc therebetween for forming an end seal member for the condenser. The rigid discs may be provided with one or more holes therein for passing the condensers terminal lead, or leads, therethrough. The deformable disc may have one or more slits therein for passage of terminals therethrough. Upon compression of the sealing means into the final condenser assembly, it is possible to seal the condenser leads around the slits by deformation of the deformable sealing lamina. My invention differs appreciably over such a prior type of a construction in that the condenser terminals or leads extend through terminal passing openings, which are open to the periphery of the individual laminated members to simplify engagement of a terminal or lead with the different sealing laminae, or else the rigid sealing members are of special shapes to facilitate assembly of a plurality of sealing laminae with a terminal extending therethrough.

For a better understanding of the invention, reference should be had to the accompanying drawings, wherein.

Figure 1:
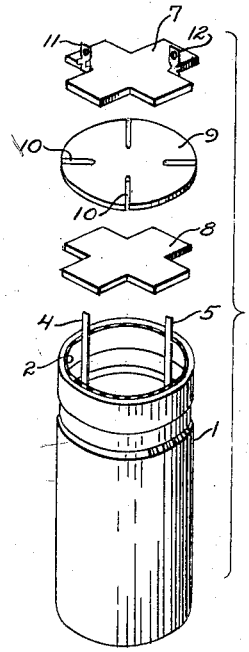
Fig. 1 is an exploded perspective view of a condenser can and sealing means therefor embodying the principles of the invention.

The drawings show a conventional condenser can 1 which has one closed end and one open end and which may be made from any desired material, and which is shown as having a resilient liner 2 positioned within the walls of the can 1 and immediately adjacent thereto and the open end of the condenser can. A conventional condenser roll 3 is positioned in the can 1 and it has a pair of terminals 4 and 5 extending therefrom, as shown. The condenser can 1 has a shoulder or internally protruding bead 6 formed therein to form a seat for limiting axially inwardly directed movement of the laminated sealing members of the invention.

As an important feature of the present invention, the open end of the condenser can 1 is sealed by means of a pair of symmetrical crosses 7 and 8 which are formed from a rigid, non-yielding material, such as a moldable insulating material like bakelite, or the like, and between which a resilient, or deformable disc 9 is positioned. The disc 9 may be made from rubber, or rubber-like material, or synthetic rubbers or other substances as long as the material forming disc 9 is deformable under pressure and is an electrical insulating material. Usually the material forming the disc 9 also should be resilient and not take a permanent set very easily.

Figure 6:
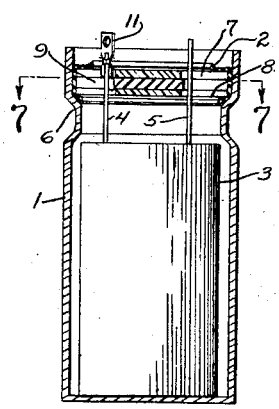
Fig. 6 is a longitudinal section, with the condenser roll being shown in elevation, of a condenser can of the invention as the sealing members are initially engaged with the condenser can and terminals.
Figure 5:
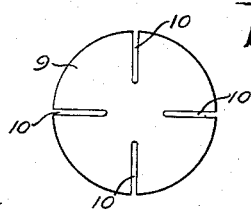
Fig. 5 is an elevation of a deformable, resilient sealing laminae.
Figure 7:
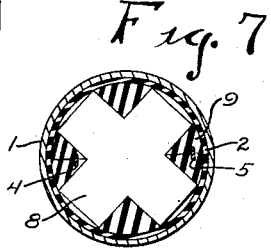
Fig. 7 is a horizontal section taken on line 7—7 of Fig. 6 after the condenser of the invention has been finally assembled.

Figs. 1 and 5 show that the disc 9 has a plurality of radially extending slots 10 formed therein which extend into the disc 9 from circumferentially spaced portions thereof. Any desired number of the slots 10 may be provided, but usually there should be a slot formed for each lead or terminal extending from the condenser roll with which the sealing member will be used. Fig. 6 of the drawings shows that the disc 9 normally will be appreciably thicker than the crosses 7 and 8 and this provides sufficient material in the disc 9 to permit such material to flow or move around under pressure and seal against any terminals extending through the slot 10 and to cause the side portions defining the slot 10 to move together and form a substantially impervious sealing unit in the condenser assembly. Figs. 6 and 7 indicate that the terminals 4 and 5 are received in the two of the slots 10 originally formed in the disc 9. Usually it is desirable to have the actual terminals of the condenser be separate from the terminals 4 and 5 so that additional terminal devices 11 and 12 are shown suitably secured to the cross 7 and these ultimate terminal devices 11 and 12 are engaged with the terminals 4 and 5 during assembly of the condenser of the invention. Figs. 1 and 6 indicate that the slotted portions 10 of the disc 9 are associated with the parts of the crosses 7 and 8 intermediate the cross arm.

The assembly of the condenser is completed by spinning, rolling or otherwise radially and axially inwardly turning the open end portion of the condenser can 1. Such action exerts compressive force on the laminated sealing means provided and comprising the crosses 7 and 8 with the disc 9 sandwiched therebetween. Such compressive action on the disc 9 effects the desired flow or distortion thereof to close the slot 10 and effectively seal the terminals 4 and 5 in the can 1. It will be appreciated, however, that the act of engaging the disc 9 with the terminals 4 and 5 is very easily and rapidly done without any possibility of bending or deforming the terminals, or otherwise damaging any of the condenser components during the assembly operation. The specific shape and positioning of the crosses 7 and 8 with relation to the disc 9 and the slots thereof also facilitates and simplifies assembly of the condenser and its components, but yet effectively achieves the desired action of a tightly sealed construction.

Figure 3:
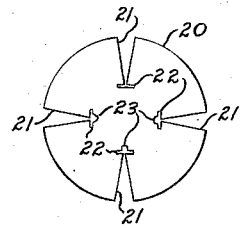

Fig. 3 of the invention shows a little different form of rigid sealing member used in forming the laminated closure of the invention and in this instance a rigid disc 20 is provided and has a plurality of substantially radially extending slots formed in circumferentially spaced portions thereof. These slots, indicated by the numeral 21, usually should be relatively narrow and normally are provided with enlarged portions at the bases or at one radially inner portion thereof. These enlarged portions of the slots 21 are indicated at 22 and some of the slots 21 are provided with enlarged inner ends 23 whereas one of the slots 21 terminates at the enlarged portion 22 therein. Of course, the disc 20 would be snugly received in the condenser can 1 and would abut on or rest against the internally extending shoulder or bead 6 provided therein. The same compressive action would be exerted through the disc 20 and would be achieved by means of the crosses 7 and 8 which likewise would have one cross bearing on or resting against the shoulder 6 in the condenser assembly.

Figure 4:
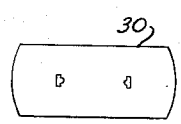

A further type of a rigid sealing member or disc 30 is shown in Fig. 4 and in this instance merely comprises more or less of a diametrically extending disc segment which has opposed edge portions eliminated to cut down on the amount of material used in forming the disc 30 and to simplify assembly of same in a condenser can. Usually if two discs 30 were used in a condenser assembly, the diameters or longer axes of the disc segments would be positioned substantially normally to each other since by such action a more complete compressive action would be exerted on the resilient disc in the laminated sealing assembly.

Figure 2:
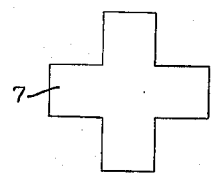
Figs. 2, 3 and 4 are elevations of different types of rigid sealing disc-like means which may be used in practice of the invention.
Figure 8:
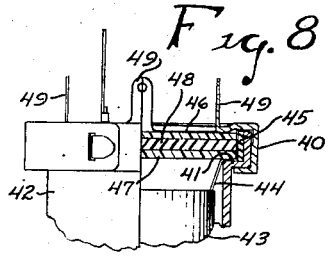
Fig. 8 is a fragmentary vertical section, partially shown in elevation, of a modification of the invention.

Fig. 8 shows a modification of the invention wherein a clamping and mounting ring 40 is provided for engaging with an externally protruding shoulder 41 that is formed adjacent the open end of a condenser can 42. A condenser roll 43 is received within the can 42 and has a terminal 44 extending therefrom which extends axially outwardly of the condenser adjacent the inner surfaces of the walls of the can 42. A sealing band or sleeve 45, that is formed from rubber or rubber-like material, is positioned between the inner surface of the can 42 and the terminal 44 but the end of the terminal 44 is bent radially outwardly and axially inwardly of the can 42 to be brought into good electrical contact therewith. The actual sealing means used in the can 42 comprises a pair of rigid discs 46 and 47, that may be like any of the structures shown in Figs. 2 though 4 hereof, whereas a resilient, deformable sealing disc member 48 is positioned intermediate the discs 46 and 47. A portion of the ring 40 is pressed or turned or otherwise shaped so that it exerts an axially inwardly extending pressure on the laminated assembly of the discs, 46, 47 and 48 in order to compress the disc 48 sufficiently to deform same and seal any slots or openings provided therein and also to force a circumferential portion thereof outwardly against the surface of the terminal 44. A plurality of mounting or terminal lugs 49 are formed on the ring 40.

The condenser container may be made of any suitable material and the relative size of thickness of the laminated sealing means used may be adjusted to provide the preferred construction.

The word "disc" is used in a broad sense in the specification and claims and refers to any kind of a member, whether it is of rectangular, square or other shape, and regardless of whether to so-called "disc" is a sheet, layer, lamina, or the like.

While several complete embodiments of the invention have been disclosed herein, it will be appreciated that modification of these particular embodiments of the invention may be resorted to without departing from the scope of the invention as defined by the appended claims.

Having thus described my invention, what I claim is:

1. A condenser comprising a metal can having an open end with an internally protruding bead formed thereon adjacent the open end of the can, a condenser roll within the said can, terminal means extending from said condenser roll and protruding from said can, and sealing means for said condenser abutted against the bead formed therein, said sealing means including a deformable resilient disc having a plurality of circumferentially spaced radially extending slots open to the periphery of the disc for passage of said terminal means therethrough, and a relatively stiff undeformable disc-like member on both faces of said resilient disc, the inner of said disc-like members abutting against the outer surfaces of said bead, said disc-like members both having openings therein for passage of said terminal means therethrough, the end of said can being inwardly turned to press said disc-like members tightly against said resilient disc and deform same to tightly close the slots therein.

2. A condenser comprising a can having an open end with an internal shoulder formed thereon adjacent the open end of the can, a condenser roll within the said can, terminal means extending from said condenser roll and protruding from said can, and sealing means for said condenser abutted against the shoulder formed in said can, said sealing means including a deformable disc having a radially extending peripheral slot open to the periphery of the disc formed therein for passage of said terminal means therethrough, and a relatively stiff undeformable disc-like member on both faces of said resilient disc, the inner of said disc-like members abutting against the outer surfaces of said bead, said disc-like members both having openings therein for passage of said terminal means therethrough, the end of said can being inwardly turned to press said disc-like members tightly against said resilient disc and close the slot therein, said disc and disc-like members being of a contour to fit relatively closely in the open end of the can.

3. In an open ended condenser having a terminal extending therefrom, laminated sealing means for the end of the condenser and comprising a resilient deformable lamina with peripheral slots open to the periphery of the disc extending thereinto spaced circumferentially around the periphery thereof for passage of a terminal therethrough, and a rigid pressure transmitting lamina adjacent each face of said deformable lamina and having openings therein registering with the slots for receiving a terminal passing therethrough, said laminae being of a contour to fit relatively closely in a condenser can.

4. In an open ended condenser having a terminal extending therefrom, laminated sealing means for the end of the condenser and comprising a unitary resilient deformable lamina with a cut extending thereinto from the periphery thereof for passage of a terminal therethrough, and a rigid pressure transmitting lamina adjacent each face of said deformable lamina and having an opening therein open to the periphery thereof and of a size to receive and easily pass a terminal therethrough, which opening is aligned with the cut in said deformable lamina, said laminae being of a contour to fit relatively closely in a condenser can.

5. In a condenser, sealing means as in claim 4, at least one of said rigid laminae being in the shape of a cross with the terminal receiving opening being intermediate the cross arms.

6. In a condenser, sealing means as in claim 4, at least one of said rigid laminae being in the shape of a disc with radially extending slots formed in the periphery thereof and being enlarged at portions thereof for receipt of the terminal means, said slots in said deformable and said rigid lamina being axially aligned.

7. In a condenser, sealing means as in claim 4, at least one of said rigid laminae being in the shape of a diametrically extending segment of a disc and having at least one hole therein for passage of a terminal therethrough.

8. In a condenser sealing means as in claim 3, said rigid laminae being in the shape of a symmetrical cross with the terminal receiving openings being intermediate the cross arms, said rigid laminae being of the same size and with the arms thereof being superimposed and having the slots in said deformable lamina circumferentially intermediate such arms.

9. In a condenser sealing means as in claim 3, said rigid laminae being in the shape of a disc with radially extending slots formed in the periphery thereof, said slots each being enlarged at the base portion thereof in a direction substantially normal to the radial axis of the slot for receipt of the terminal means.

10. In a condenser sealing means as in claim 3, said rigid laminae being in the shape of a diametrically extending segment of a disc and having a plurality of slots therein of a size for easy passage of a terminal therethrough, the longitudinal axes of said rigid laminae being substantially normal to each other.

References Cited in the file of this patent

UNITED STATES PATENTS

| Number | Name | Date |
|---|---|---|
| 737,720 | Duncan | Sept. 1, 1903 |
| 865,907 | Jodrey | Sept. 10, 1907 |
| 2,018,486 | Cole | Oct. 22, 1935 |
| 2,144,959 | Blackburn | Jan. 24, 1939 |
| 2,202,166 | Peck | May 28, 1940 |

FOREIGN PATENTS

| Number | Country | Date |
|---|---|---|
| 288,149 | Great Britain | July 1, 1929 |
| 324,995 | Great Britain | Feb. 10, 1930 |